(12) United States Patent
Hawkins et al.

(10) Patent No.: US 7,791,476 B2
(45) Date of Patent: Sep. 7, 2010

(54) OCCUPANT SENSOR AND METHOD FOR SEAT BELT OR OTHER MONITORING

(75) Inventors: Eric T. Hawkins, Lawrenceville, GA (US); Masahiro Miyamori, Alpharetta, GA (US)

(73) Assignee: Elesys North America, Inc., Suwanee, GA (US)

( * ) Notice: Subject to any disclaimer, the term of this patent is extended or adjusted under 35 U.S.C. 154(b) by 494 days.

(21) Appl. No.: 11/676,472

(22) Filed: Feb. 19, 2007
(Under 37 CFR 1.47)

(65) Prior Publication Data
US 2007/0194900 A1  Aug. 23, 2007

Related U.S. Application Data

(60) Provisional application No. 60/775,515, filed on Feb. 21, 2006.

(51) Int. Cl.
*G08B 13/26* (2006.01)
(52) U.S. Cl. .............. 340/561; 340/660; 340/943; 701/1; 701/45; 701/300
(58) Field of Classification Search ........... 340/561, 340/562, 438, 426.24, 660–667, 541, 943; 701/45–46, 300, 1
See application file for complete search history.

(56) References Cited

U.S. PATENT DOCUMENTS

| | | | |
|---|---|---|---|
| 3,943,376 A | 3/1976 | Long | |
| 5,127,575 A | 7/1992 | Beerbaum | |
| 5,406,627 A | 4/1995 | Thompson et al. | |
| 5,683,103 A * | 11/1997 | Blackburn et al. | .......... 280/735 |
| 5,770,997 A | 6/1998 | Kleinberg et al. | |
| 5,825,283 A * | 10/1998 | Camhi | ............ 340/438 |
| 5,948,031 A | 9/1999 | Jinno et al. | |
| 6,161,070 A * | 12/2000 | Jinno et al. | .............. 701/45 |
| 6,329,913 B1 | 12/2001 | Shieh et al. | |
| 6,329,914 B1 | 12/2001 | Shieh et al. | |
| 6,696,948 B2 * | 2/2004 | Thompson et al. | .......... 340/561 |
| 6,757,602 B2 | 6/2004 | Breed et al. | |
| 6,768,420 B2 | 7/2004 | McCarthy et al. | |
| 6,816,077 B1 * | 11/2004 | Shieh et al. | ............ 340/602 |
| 6,869,100 B2 | 3/2005 | Breed et al. | |
| 6,942,248 B2 * | 9/2005 | Breed et al. | ............ 280/735 |
| 6,958,451 B2 | 10/2005 | Breed et al. | |

(Continued)

OTHER PUBLICATIONS

International Search Report and Written Opinion for PCT/US 07/04535 completed Oct. 27, 2007.

(Continued)

*Primary Examiner*—Daniel Previl
(74) *Attorney, Agent, or Firm*—Brinks, Hofer, Gilson & Lione (57) ABSTRACT

The change in voltage or current of the antenna is measured by the time to reach a particular voltage level. Using either charging and/or discharging, the times to reach two or more different levels of the total charge are measured. By providing sensor electronics with each sensor or antenna, a more versatile system may be provided. The sensors and associated electronics communicate using a bus or other communication path to a processor. The processor determines an occupant state based on the received sensor information. Different numbers of sensors may be used with the same system.

26 Claims, 7 Drawing Sheets

U.S. PATENT DOCUMENTS

| | | | |
|---|---|---|---|
| 7,164,117 B2 * | 1/2007 | Breed et al. | 250/221 |
| 2003/0047998 A1 * | 3/2003 | Lester | 307/10.1 |
| 2003/0204295 A1 | 10/2003 | Thompson et al. | |
| 2005/0056467 A1 * | 3/2005 | Hofbeck et al. | 177/2 |
| 2005/0121885 A1 | 6/2005 | Shieh | |

OTHER PUBLICATIONS

International Preliminary Report on Patentability for PCT/US07/04535 dated Sep. 4, 2008.

* cited by examiner

OCCUPANT SENSOR AND METHOD FOR SEAT BELT OR OTHER MONITORING

RELATED APPLICATIONS

The present patent document claims the benefit of the filing date under 35 U.S.C. §119(e) of Provisional U.S. Patent Application Ser. No. 60/775,515, filed Feb. 21, 2006, which is hereby incorporated by reference.

BACKGROUND

The present invention relates to occupant detection. In particular, an occupant sensor and associated methods for detecting an occupant and using the detection are provided.

Occupant detection in conjunction with sensing a crash determines whether to activate an airbag. Various occupant detection systems have been proposed, including detection based on ultrasound, infrared, radar, electric field, capacitance, weight or combinations thereof. The occupant detection systems use antennas positioned in various locations within a vehicle, such as within a windshield, within a roof liner, in floor mats, or within a seat. The antennas are piezoelectric material, conductive materials, or other structures. For example, a conductive textile or flexible metallic electrode within a seat allows capacitive or electric field-based detection of an occupant. As another example, strain gauges or other associated pressure sensing sensors on flexible circuit material within a base portion of the seat detect an occupant.

To distinguish between different types of materials, such as an occupant and a bag of groceries, various sensing techniques have been developed. The change in frequency due to a different capacitance from multiple different antennas is one technique. Another technique is complex image processing. Classification from different types of data based on experimentation or neural network processes is another technique. Other techniques include determining electric field strength from different electrodes at different distances away from a seating area. However, these systems may be complex for distinguishing between multiple categories of occupant with reliable use with air bag systems.

BRIEF SUMMARY

By way of introduction, the preferred embodiments described below include methods, sensors and systems for detecting an occupant or characteristic and/or for seat belt monitoring. An occupant sensor with an arrangement of multiple antennas or a simple single antenna determines a charge or discharge characteristic of the antenna. By providing sensor electronics with each sensor or antenna, a more versatile system may be provided. The sensors and associated electronics communicate using a bus or other connection to a processor. The processor determines an occupant state based on the received sensor information. Different numbers of sensors may be used with the same system.

By determining the change in voltage or current of the antenna as a function of time, any occupant may be detected or characterized. In one embodiment, the sensor response is measured by the time to reach a particular voltage level. Using either charging and/or discharging, the time to reach two or more different levels of the total charge is measured. The sensor outputs an excitation signal and monitors the response of the antenna. A comparison is made between the monitored antenna voltage level and some reference voltage level. A resistor network is used to set different reference levels. A processor determines the occupant state based on the measured times.

The sensor restricts air bag activation or is used for another purpose. The same or different occupant sensor is used for seat belt warnings. A seat belt latch sensor determines whether a seat belt is being used. The occupant sensor determines whether the seat belt should be used. A driver is warned when a seat belt should be used by an occupant, but is not.

In a first aspect, a sensor system is provided for seat belt monitoring or occupant detection. A first antenna is adjacent to an occupant space. A first circuit connects with the first antenna. The first circuit is operable to sense with the first antenna. A processor is operable to determine an occupant state as a function of first information output by the first circuit. A communications path connects with the first circuit and the processor and is operable to carry the first information from the first circuit to the processor. The processor is spaced from the first circuit.

In a second aspect, a method is provided for seat belt monitoring or occupant detection. One or more sensor modules are provided. Each sensor module includes at least one antenna and at least one measurement circuit. Each sensor module is operable to detect responsive to any occupant in a vehicle. A common processor is operable to determine an occupancy state as a function of the detections from the sensor modules. Communications are arranged from each of the sensor modules to the common processor. The common processor is operable with different numbers of the sensor modules.

In a third aspect, a sensor system is provided for seat belt monitoring or occupant detection. A first antenna is positioned adjacent to an occupant space. A first circuit connects with the first antenna. The first circuit is operable to change a voltage or current applied to the first antenna and operable to detect a response of the first antenna to the change as a function of timing.

In a fourth aspect, a method is provided for seat belt monitoring or occupant detection. An antenna adjacent to an occupant space is charged or discharged. The charging or discharging is timed relative to a reference level. An occupant state of the occupant space is determined as a function of the timing.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

A response of an antenna as a function of time to a change in voltage or current applied to the antenna is measured. The response, such as an integral of the discharge or charge characteristic of the antenna, maps to an occupant classification. As an alternative to the integral, the time to different charge or discharge levels may be measured and mapped to an occupant classification. Occupant classifications include no occupant, an occupant, an object (e.g., car seat), occupants of particular sizes (e.g., 5% female or larger, 6 year old or larger or other groupings), and/or other classifications.

In one implementation of the occupant sensor system, an under-sampled electric field sensing circuit uses the response of a sensor to a step voltage to determine the sensor's lumped capacitance and resistance. A micro-controller excites the antenna. The micro-controller also contains an analog-to-digital controller to resolve voltage measured across the antenna. To minimize power consumption and cost, the micro-controller operates at a low frequency relative to the charge and discharge cycle and operates with a low ADC bandwidth. The discharge or charge waveform is digitized by aliasing the high frequency signal content into the pass-band of the converter using under-sampling.

In another implementation, electronics at the sensor output an indication of when a particular charge or discharge occurs on the antenna. The time to reach the charge or discharge is used to determine the charge or discharge response. FIGS. 9-12 are example embodiments of this implementation.

FIGS. 1-8 introduce occupant sensor systems. FIGS. 9-12 show further embodiments. The occupant sensor using the charge or discharge response or a different occupant sensor is used for seat belt monitoring or air bag activation limitation. For example, an electric field-based occupant sensor determines the presence of an occupant in a seat, such as distinguishing between occupants and items or distinguishing between 6-year-old size or smaller from larger sized occupants. A seat belt latch sensor determines whether the seat belt is being used. If the seat belt is not being used but an occupant is detected (e.g., 6 year old or larger size), a seat belt warning is generated.

Figure 1:
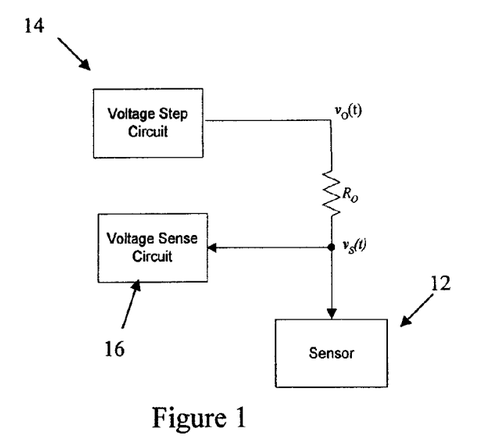
FIG. 1 is a block diagram of one embodiment of an occupant sensor for detecting an occupant.

FIG. 1 shows one embodiment of an occupant sensor for detecting an occupant or characteristic of an occupant or item. The occupant sensor includes a sensor or antenna 12, a voltage step circuit 14, a voltage sense circuit 16 and a series resistor $R_o$. Additional, different or fewer components may be provided. For example, additional resistors, capacitors or inductors are included. As another example, current step and sensing circuits are used instead of or in additional to voltage. As another example, the voltage step circuit 14 operates more gradually on charge or discharge. More than one antenna 12 with a multiplexer or additional circuits 14, 16 may be used.

The antenna 12 is an electrode, loop conductor, patterned conductor, linear conductor or other now known or later developed antenna. Single layer or multiple layers antennas may be used. In one embodiment, the antenna 12 is a single loop antenna, but nested or separate transmit and receive antennas may be used.

The antenna 12 is positioned by an occupant space. For example, the antenna is positioned in a window, on a steering wheel, on a dashboard, in a seat, on a seat back, in a seat base, on a floor or other location in a vehicle. A same antenna 12 may extend into multiple of these locations, or multiple antennas 12 may be provided for different locations. In one embodiment, a single antenna 12 is positioned in a seat base or a seat back on a surface adjacent the occupant space, such as beneath the fabric at a location likely positioned by the buttocks or lower back of a normally seated adult occupant. For example, the antenna 12 is on or in a base portion of a vehicle seat adjacent the occupant space and adjacent to a back of the vehicle seat. The seat is a passenger, driver, bench, bucket or other seat of a vehicle. Seats in other settings, such as seats at a movie theater, may be used.

The voltage step circuit 14 is a voltage or current source connected with the antenna 12. The voltage step circuit 14 is a waveform generator, such as a transistor or switch with a power source, digital-to-analog converter, or other now known or later developed device for applying a change in voltage or current to the antenna 12. The voltage step circuit 14 outputs only a single step. Alternatively, the change in voltage or current repeats, such as applying an ongoing square wave. In one embodiment, the voltage step circuit 14 is a transistor for generating a unipolar square wave between 0 and 5 volts. Greater or lesser amplitude, and/or non-square waves (e.g., sinusoidal) may be used.

In one embodiment, the increasing voltage portion of each pulse in a pulse train is different from a decreasing portion of the pulses. For example, the increasing voltage is gradually changed in magnitude to limit electromagnetic interference. The discharge portion is a step. Alternatively, both the rising and falling portions are gradual, or the rising portion is a step and the falling portion is gradual.

The voltage sense circuit 16 is an analog-to-digital converter and a processor or other now known or later developed voltage or current measurement circuit. In one embodiment, the voltage sense circuit 16 is a micro-controller also used for the voltage step circuit 12. For example, the voltage sense circuit 16 has an analog-to-digital converter (ADC) channel, an internal oscillator, and low power consumption. The circuit may be powered from a RS232 serial port or other port. The output drive capability of the microcontroller is sufficient to provide a charging pulse to a capacitive load. For the ADC, the reference used is an external voltage supply sourced by a linear regulator. Other micro-controllers may be used with the same or different characteristics. Alternatively, separate devices are provided. For example, an external oscillator is provided. As another example, an external voltage source is the ADC reference.

The voltage sense circuit 16 includes an occupant detection circuit operable to detect an occupant. In the embodiment of the voltage sense circuit 16 as a processor, the processor characterizes or classifies the occupant as a function of the sensed voltage or current. In an alternative embodiment, a separate processor or micro-controller is provided for characterizing or classifying the state of the seat (e.g., occupied, occupied by a person, occupied by a 6 year old or larger person).

The voltage sense circuit 16, voltage step circuit 14 and/or antenna 12 are on a circuit board or flexible circuit material, or may be connected together with cables. Where capacitance is measured, the capacitance from any ground plane in the occupant sensor is subtracted from the final value. A metal box or other structure may be used to house the occupant sensor circuits 14, 16, but plastic, potting, no housing or other housing materials may be provided. In one embodiment, copper traces and fills adjacent an interface are eliminated or reduced. The occupant sensor is guard-banded. A surface mount, flip chip, or other mounting is used for the components.

Figure 2:
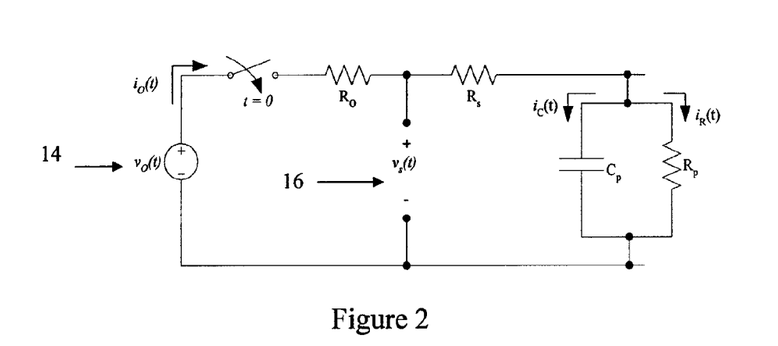
FIG. 2 is a circuit model of an occupant sensor in one embodiment.

FIG. 2 shows a model of the occupant sensor of FIG. 1. $V_o$ is the excitation voltage from the voltage step circuit 14. $R_o$ is the excitation series resistance. $R_s$ is the lumped series resistance of the circuit minus sensor and excitation source. $R_p$ is the lumped parallel resistance of the sensor. $C_p$ is the parallel capacitance of the sensor. $V_s$ is the measured response of the sensor. The voltage sense circuit 16 measures $V_s$. A general expression for capacitance as seen by the sensor is:

$$C = \frac{v_O(t) - v_S(t)}{\frac{dv_s(t)}{dt}(R_O + R_S)}$$

Other expressions of the capacitance may be used. Other models of the occupant sensor may be used.

The response of the antenna 12 is a function of capacitance of the antenna 12. For example, the antenna 12 with or without an occupant has a capacitive load of less than 200 pF. To distinguish between different loads adjacent the antenna 12, the voltage sense circuit 16 resolves changes in capacitance to 1 pF, but other greater or lesser capabilities may be provided. The range of capacitance values is proportional to the delay loop implemented by the system. An upper bound may be approximately 150 pF, and a lower bound may be approximately 3 fF. These values are a function of the microcontroller firmware, number of cycles per instruction and internal clock speed of the microcontroller, so other values may be used.

The voltage sense circuit 16 classifies as a function of a response of the antenna 12 to a change in voltage or current. The voltage sense circuit 16 is a measurement circuit operable to measure a response on the antenna 12 as a function of time to a first change in the voltage or current supplied by the voltage or current step circuit 14. For example, the voltage step circuit 14 applies a step in the voltage, such as a rising or falling edge of a square wave. In response to the change in the applied voltage or current, the voltage or current on the antenna 12 changes or varies. The rate of change varies as a function of time based on the capacitance.

Figure 3:
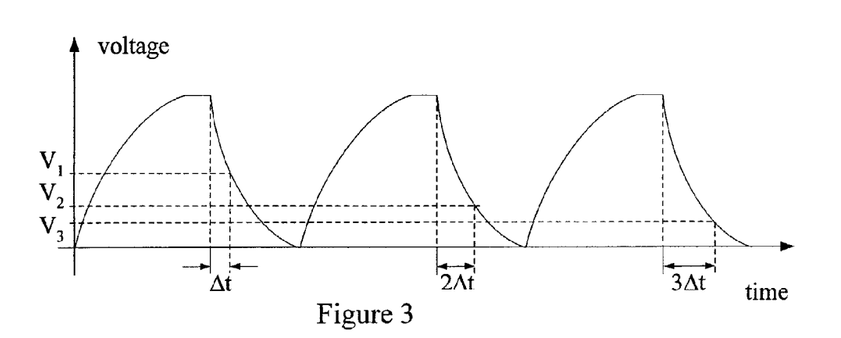
FIG. 3 is a graphical representation of one embodiment of measuring voltage response of an antenna as a function of time.

FIG. 3 shows a voltage of the antenna 12 through three cycles of an applied square wave. The change in voltage is generally exponential due to the capacitance. The capacitance causes gradual voltage variation in response to the more sudden change in applied voltage. The change is voltage is measured. For example, the change in voltage as the voltage increases (charging voltage) is measured. As another example, the change in the voltage as the voltage decreases (discharging voltage) is measured. Effects of noise due to power-supply may be reduced by measuring the discharge edge of the waveform. Both charging and discharging voltages of the antenna 12 may be measured. Alternatively, current charging and/or discharging are measured. In another alternative, the time to reach predetermined levels is determined.

In one embodiment, the change is measured during a single cycle. Other measurements from other cycles may be averaged or filtered. In another embodiment, the measurement circuit samples the change over repetitions of the applied voltage cycle to account for low bandwidth measuring devices. FIG. 3 shows under sampling of the voltage waveform across the capacitance of the antenna 12. In time, each sample is taken at $T+(\Delta t \times n)$, and the corresponding voltage at that point is measured and stored. When reconstructed, each n data point is separated in time by only $\Delta t$ relative to the beginning of charge or discharge. The data points from multiple cycles represent one complete waveform of length T. The voltage is quantified with reduced bandwidth requirements, resulting in increased sensitivity to smaller capacitance values.

Any change characteristic may be used. For example, a difference in voltage at two or more different times indicates the occupant state. A derivative of the change, a rate of change, a value at a particular time relative to the cycle and/or other characteristic of the charging or discharging response of the antenna 12 is used. In one embodiment, the measurement circuit or voltage sense circuit 16 integrates the change as a function of time on the antenna. The area under the reconstructed charge or discharge waveform may be less sensitive to the effects of noise than other characteristics. The area is computed as the integral using standard numerical techniques such as the simplified trapezoidal rule with an arbitrary unit time step. Other integration techniques may be used. The discharge, charge or both discharge and charge are integrated. Combinations of change characteristics may be used. The characteristics may be filtered. Timing or other sampling may be used to estimate the integral or avoid integration.

Figure 4:
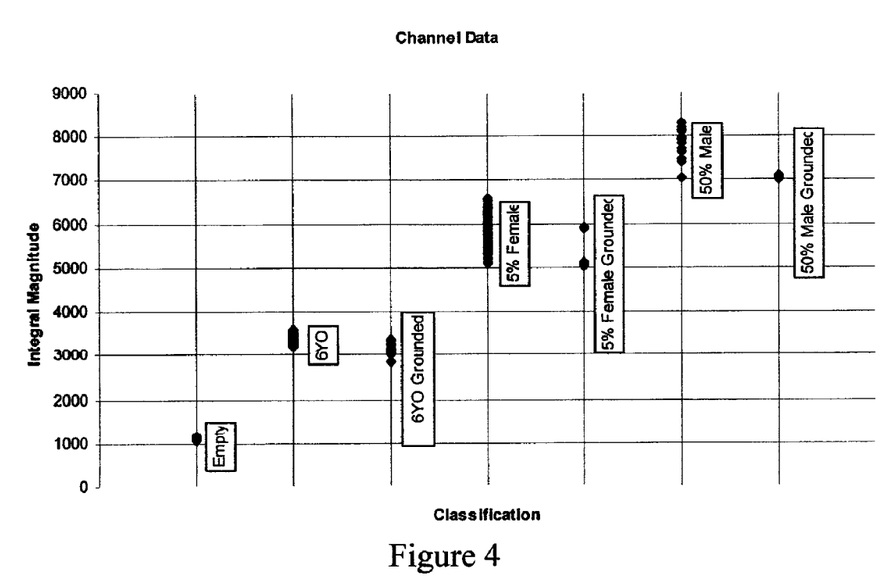
FIG. 4 is a graphical representation of an embodiment of classification of an occupant based on measured antenna response.

A processor, such as the voltage sense circuit 16, characterizes the occupant as a function of the response of the antenna 12. Different values of the response characteristics may indicate different occupant classifications. For example, FIG. 4 shows different values of the integral of discharge for an antenna 12 positioned in a seat base near the back. The data space is in a measurement domain or scales as a function of the cycle time or measurement increment. An absolute time scale may be used. The values distinguish between any two or more occupant states, such as distinguishing empty from all other states. The values may distinguish between different size ranges of occupants, such as distinguishing empty and six year old or younger size from larger sizes. Data clustering techniques group data points and segregate information based on observations with respect to occupant classification. More than one type of value may be included. In FIG. 4, the grounded state corresponds to the occupant touching a grounded object in the vehicle. The non-grounded state corresponds to the occupant being free of direct contact with a grounded object in the vehicle.

Similar groupings may be used for timing determination. Different occupant states are associated with different rates of charge or discharge.

The data prior to classification or classification may be filtered. In one embodiment, the judgment lock or other filtering disclosed in U.S. Pat. No. 7,065,438 (Publication No. 2003-0204295), the disclosure of which is incorporated herein by reference, is used. Alternatively, additional filtering or judgment lock is not provided.

Figure 5:
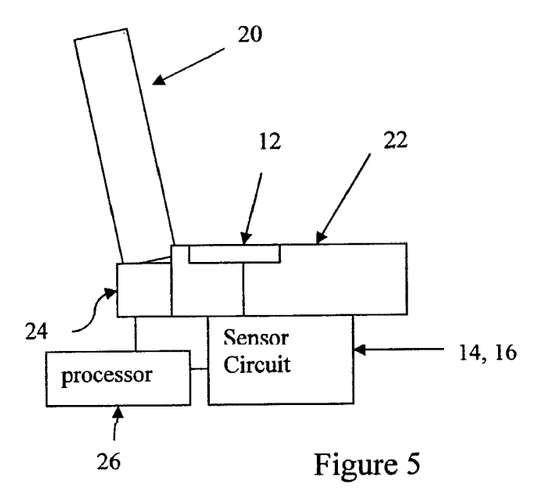
FIG. 5 is a graphical representation of one embodiment of a vehicle seat with an occupant sensor.
Figure 6:
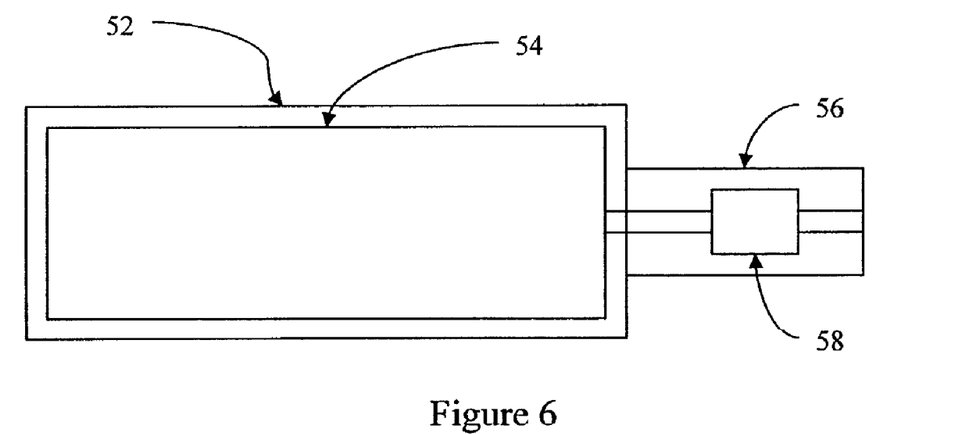
FIG. 6 is a top view of one embodiment of an antenna and circuit for occupant sensing.

FIG. 5 shows the occupant sensor in a seat 20 of an automotive vehicle. The sensor circuits 14, 16 are on a circuit board. Alternatively, a flexible circuit is used. FIG. 6 shows one embodiment integrating the antenna 12 and sensor circuits 14, 16 as a flexible circuit positioned in the seat 20. The antenna 12, voltage step circuit 14 and/or the voltage sense circuit 16 may be implemented on different circuit boards or flexible circuits.

FIG. 6 shows implementation on flexible circuit material. The flexible circuit includes a flexible film 52. The flexible film 52 is flexible circuit material, such as a Polyimide (Kapton®) film, PET Polyester (Mylar®) film, PEN Polyethylene Napthalate or other now known or later developed flexible materials for use as a flexible circuit substrate. The flexible circuit material may have active or passive electrical circuit components integrated on the material, or the flexible film 52 is free of active and/or passive components.

The flexible film 52 has one or more antennas 54 and associated signal traces formed on the material. The antennas 54 are copper, conductive electrodes, strain gauges, pressure sensors, radio frequency antennas, piezoelectric films, semiconductor film based diodes or light detectors, combinations thereof or other now known or later developed sensors for detecting a presence or characteristic of an occupant. The antenna 54 is for use with capacitance or electric field or capacitance based sensing, but weight or other sensors may be used.

The antennas 54 are used by the sensor circuits 58. The sensor circuits 58 are formed as a flexible circuit on a tail 56 of the flexible circuit material 52. The signal traces connect the antenna loop 54 or antenna area with the sensor circuits 58. The traces are of a same or different material as the antenna loop 54, such as both being deposited, etched or form rolled annealed copper or other flexible metallic or conductive material.

The tail 56 is of any length, such as from a few inches to a yard. The antenna loop 54 is within the seat 20. The tail 56 extends from the antenna loop 54 to a connector and location for connection to other processors or devices, such as an air bag processor or a seat belt warning light. For example, the tail 56 extends for connection under a seat.

The flexible film 52 is a solid material, but may include apertures in sections apart from or including the antennas 54. For example, one or more apertures allow for greater flexibility, airflow, water drainage or may be provided for other purposes. For example, the apertures more easily allow the flexible film 52 to conform to the molded structure of a seat.

Additional components may form on or connect to the flexible material 10. For example, a temperature, humidity or both temperature and humidity sensor connect with the flexible material 52 or are integrated as part of the sensor circuits 58. In one embodiment, one of the additional sensors disclosed in U.S. Pat. No. 6,816,077 is provided.

In alternative embodiments, the sensor circuits 58 are on a separate circuit board, such as a 2-layer circuit board. Two layer flexible circuits may also be provided. One layer acts as a dedicated ground plane. The ground plane also provides a low transfer impedance ground structure to which outgoing communication lines are decoupled at RF. Alternatively, no ground plane or other shielding is used.

The occupant sensor is used for air bag control. For example, the air bag is prevented from deployment for small children, small adults, and/or inanimate objects. In another embodiment, the occupant sensor is a sensor system for seat belt monitoring. FIG. 5 shows one embodiment for seat belt monitoring. The seat 20 includes an occupant sensor (antenna 12 and sensor circuits 14, 16), a seat belt latch sensor 24, and a processor 26. Additional, different or fewer components may be provided.

The seat belt latch sensor 24 is a conductive switch sensor. If the metal latch of the seat belt is inserted or latched, a conductive path is formed. If the metal latch is not inserted, an open circuit is formed. The seat belt latch sensor 24 senses the conductive path or open circuit based on voltage or current through the seat belt latching device. Other now known or later developed seat belt latch sensors 24 may be used.

The occupant sensor includes an antenna 12. The antenna 12 is for electric field, capacitive, other radio frequency based sensing, infrared, optical, acoustic or other transmitted field sensing. For example, the occupant sensor includes the antenna 12 and the sensor circuits discussed above for FIGS. 1, 2, 3 or 4. In other embodiments, the voltage sense circuit 16 is a processor, amplifier, filter, applications specific integrated circuit, field programmable gate array, digital component, analog component, combinations thereof or other now known or later developed devices for determining a presence or characteristic of an occupant. For example, the occupant sensor uses pattern recognition or other processes for optical, acoustic or infrared sensing. In another example, one of the occupant detection circuits disclosed in U.S. Pat. Nos. 5,406,627, 5,948,031, 6,161,070, 6,329,913, 6,329,914, 6,816,077, and 6,696,948, the disclosures of which are incorporated herein by reference, is used. The effect of an occupant on an electric field is used to determine the presence or other characteristic of an occupant, such as a human or an inanimate occupant. The loading current or other values associated with the transmission of radio frequency waves are used to determine the occupant information. Alternatively, the transmission from antenna 12 and reception at other antennas is used. Other electric field or capacitive sensing circuits may be used, such as a circuit for determining a capacitance, a frequency change, current level, voltage level or other characteristic of an occupant effect on an electric field or a capacitance value.

The occupant sensor distinguishes between occupants and inanimate objects. The occupant sensor may distinguish between other classifications, such as between occupants of at least two different sizes. Distinctions in position, height, posture, weight, head location, or other characteristics of an occupant may be used additionally or alternatively based on placement and number of sensors or electrodes.

The processor 26 is a processor of the sensor circuit 14, 16, the seat belt latch sensor 24, or a separate processor. For example, the processor 26 is a general processor, digital signal processor, application specific integrated circuit, field programmable gate array, digital circuit, analog circuit or other now known or later developed device for generating a warning signal as a function of inputs. The processor 26 generates a seat belt warning in response to detection of an occupant by the occupant sensor and detection of lack of seat belt latching by the seat belt latch sensor. For example, the occupant sensor detects an occupant in a rear seat of a vehicle, but the seat belt latch sensor does not detect use of the seat belt in the rear seat position. An audible or visual indication warns the driver and/or the detected occupant. The warnings may be for any of the seating locations in the vehicle.

The seat belt warning may distinguish between occupants of different sizes. For example, a seat belt warning is not generated for occupants of a six year old or smaller size. A car seat may use a latch system rather than a seat belt, so a seat belt warning is avoided for occupants small enough to be in a car seat. The distinction may be different for different seating locations, such as no size distinction for a driver or front passenger seat locations.

Figure 7:
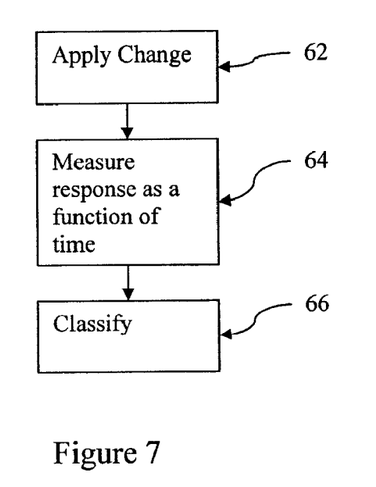
FIG. 7 is a flow chart diagram of one embodiment of a method for sensing an occupant.

FIG. 7 shows a method for sensing an occupant. Additional, different or fewer acts may be used. The acts are performed in the order shown or a different order.

In act 62, a change in voltage or current is applied to an antenna adjacent an occupant space. A step or more gradual change is applied. For example, a source of voltage or current is connected to or disconnected from the antenna. As another example, a waveform generator applies a waveform with a change in voltage or current amplitude. The change is an increase or a decrease, such as reducing a voltage or current applied from a waveform generator. The change may be repeated, such as applying a square wave. In one embodiment, the addition or increase in voltage or current is performed gradually to avoid electromagnetic interference. After gradually charging the antenna, the voltage or current is more rapidly removed, discharging the antenna more rapidly than charging the antenna. In other embodiments, the discharge is more gradual, both charging and discharge are rapid or a step function, or both charging and discharging are gradual.

In act 64, a response of the antenna is measured as a function of time. The response is to the change of the voltage or current applied to the antenna. Due to the capacitance associated with the antenna, the voltage or current of the antenna changes more gradually or differently than the applied waveform. The capacitance of the antenna is a function of the adjacent load. The antenna acts as one capacitive plate and the vehicle or other conductor acts as the ground plate. By measuring the voltage or current on the antenna as a function of time, the effects of any occupant adjacent to the sensor are measured. For example, the discharge response or characteristic of the antenna is measured. The characteristic as a function of time indicates one or more characteristics of any occupant. In other embodiments, the response is measured by comparing the voltage or current on the antenna to a predetermined value. The time from a previous predetermined value, such as at the start of the change of the applied waveform, to reach the current predetermined value or values (e.g., ⅓ and ⅔ total) is measured.

In one embodiment, the response for each change is measured during one change. In other embodiments, the response is sampled over multiple repetitions of the change to determine the response.

The response is measured as a voltage or current. Capacitance, resistance, impedance, or other property may be measured. The measurement indicates the occupant state. Alternatively, the response is calculated from the measurements. For example, the area of the charge or discharge response is calculated. Integrating the response as a function of time can reduces the effects of noise. As another example, the time to reach one or more levels from any given start time indicates the response of the antenna to any occupant load.

In act 66, any occupant is classified as a function of the response. Thresholds, pattern matches, distributions of multiple measurements, distributions of multiple types of measurements, distributions of multiple different calculations, or combinations thereof distinguish between two or more occupant states. For example, a raw or average area of the discharge characteristic distinguishes between at least two size ranges of occupants based on a threshold.

In one embodiment, a common processor connects with modular sensing circuits. The sensing circuits communicate measurement information, such as integrals, voltage values, current values, timing, or other measured characteristics to the common processor. The common processor determines the occupant state for an occupant space. The common processor may be spaced from the sensing circuits and/or antennas, such as being under a seat with the sensing circuits and antennas on the sides, within, and/or on a seating surface. A bus or other communications path may allow for any configurable number of modular sensing circuits and associated antennas to be used.

Figure 8:
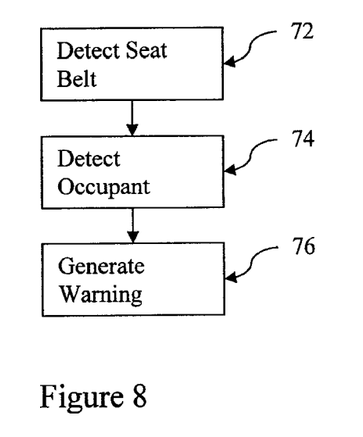
FIG. 8 is a flow chart diagram of one embodiment of a method for seat belt monitoring.

FIG. 8 shows a method for seat belt monitoring. Using the method of FIG. 7, a seat belt warning is generated as a function of the classification. Other occupant detection methods may be used. Additional, different or fewer acts than shown in FIG. 8 may be used. The acts are performed in the order shown or a different order. For example, act 74 is performed before or substantially simultaneously with act 72.

In act 72, whether a seat belt is latched is detected. A seat belt sensor detects through conductivity or other sensing whether a seat belt is latched, extended, or fastened. In act 74, whether an occupant is present is detected with an electric field. Capacitance, current draw, optical or other electric field based sensing may be used. Alternatively, acoustic or weight sensors are used. The occupant detection distinguishes between inanimate objects and humans and/or between at least two size ranges of occupants. In act 76, a seat belt warning is generated if the seat belt is not latched and an occupant is present. For example, an audible alarm and/or visual indication are generated for one size range of occupants and not for another size range.

Figure 9:
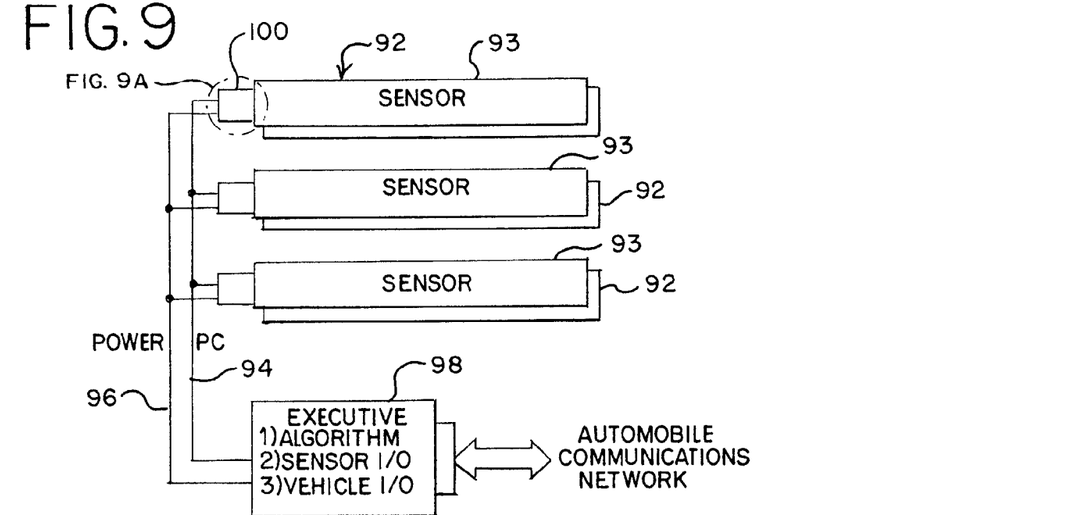
FIG. 9 is an illustration of modular sensors and associated measurement electronics in one embodiment.
Figure 9A:
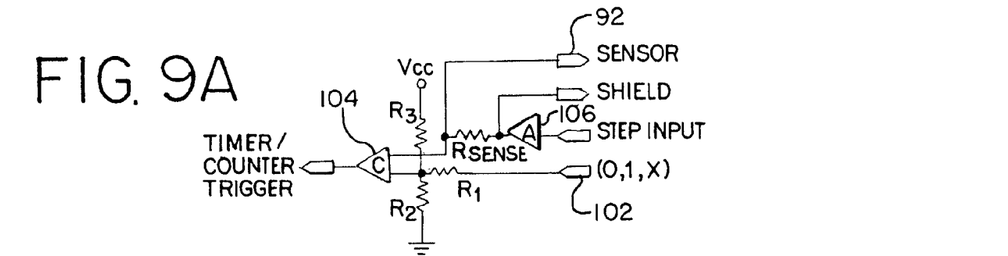
Figure 10:
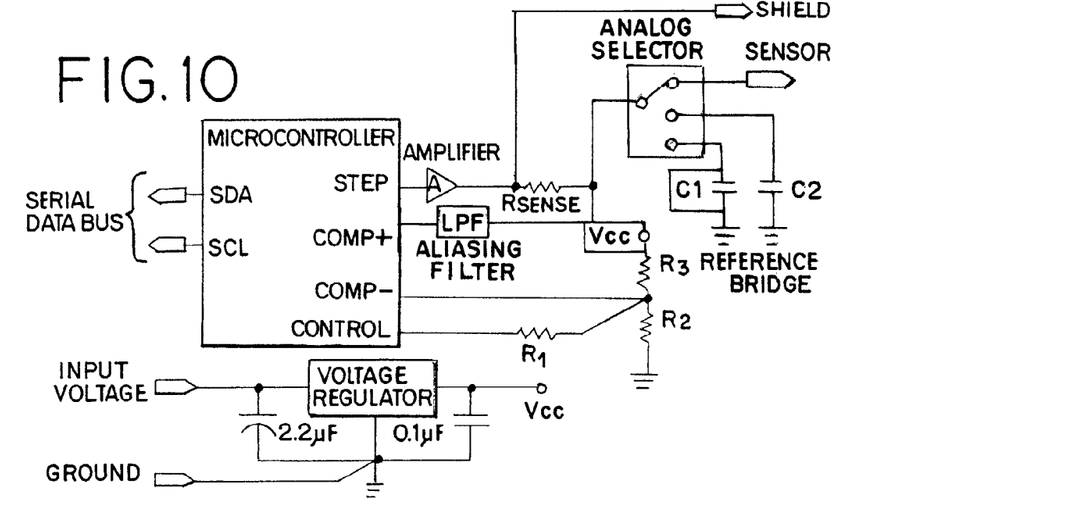
FIG. 10 is an illustration of another embodiment of the sensor based measurement electronics.
Figure 11:
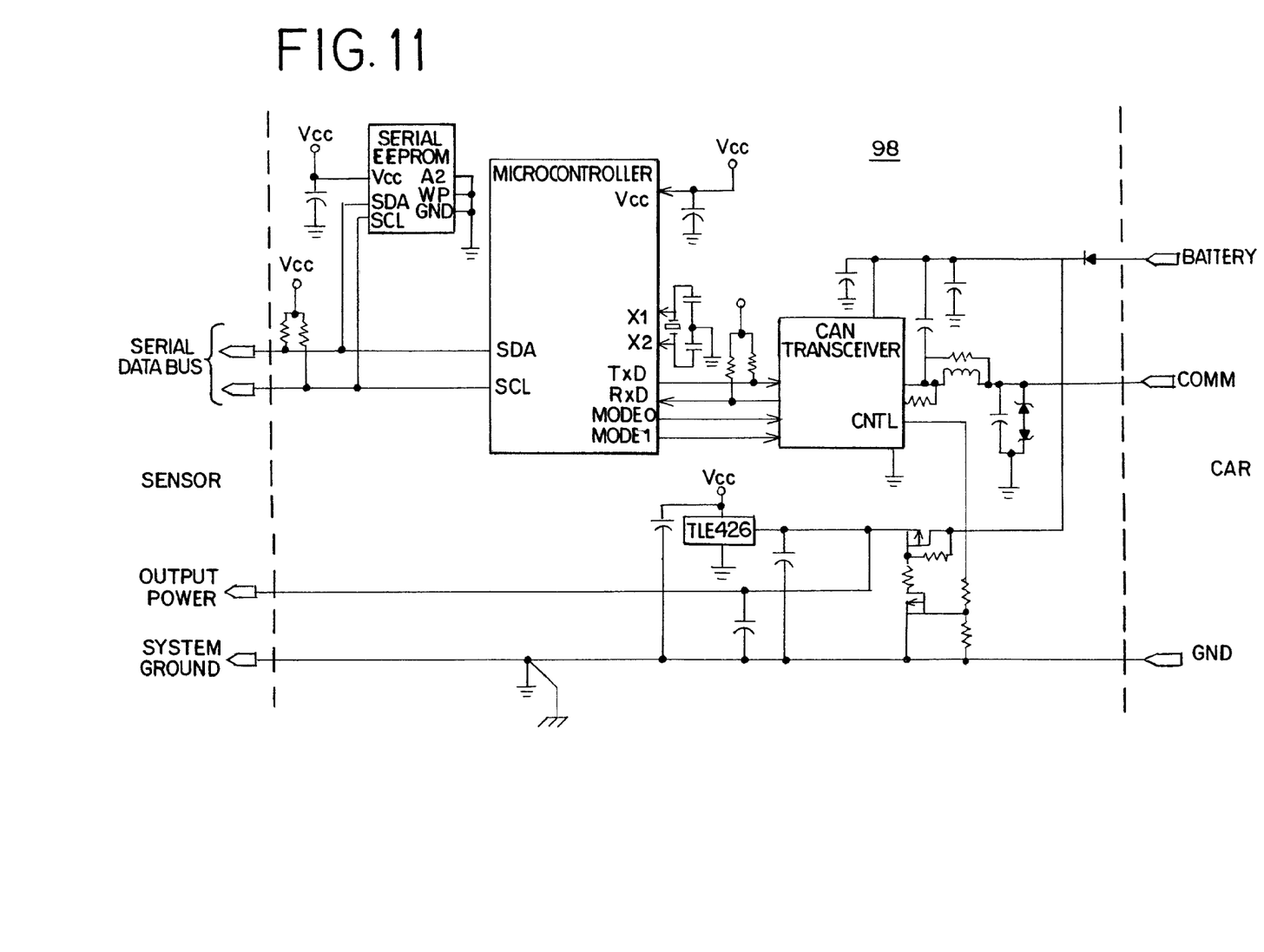
FIG. 11 is a circuit diagram of one embodiment of electronics in a processor for determining an occupant state or characteristic.

In other embodiments, timing of charging or discharging, modular sensors, or combinations thereof are used. FIGS. 9-11 show example embodiments.

FIG. 9 shows another embodiment of a sensor system for occupant detection. Electronics at the sensor output an indication of when a particular charge or discharge occurs on the antenna. The time to reach the charge or discharge is used to determine the charge or discharge response. The output is over a communications path to a processor spaced from the sensor circuit. Modular and timing of charge or discharge may be used together as shown in the embodiment of FIG. 9. Alternatively, timing or modular sensor circuits are used without the other.

The occupant detection sensor system includes a sensor 92 with an antenna 93 and sensor electronics 100, a processor 98, a bus 94 and a power connection 96. Additional, different or fewer components may be provided, such as providing the power connection 96 as part of the bus 94.

The sensors 92 include an antenna 93 with two layers of copper separated by a thin dielectric. The bottom layer of the antenna 93 is between any seat heater structures or other metal structures of the seat and the top layer. This bottom layer is used as a shield layer, such as connected with ground or a transmit signal. A separate shield signal may be used. Other antennas structures, such as described above for FIG. 1, may be used.

Three sensors 92 are shown, but additional or fewer sensors may be used. The sensors 92 are modular, allowing connection of a different number of sensors 92. The processor 98 is a common processor and includes instructions for operating with different numbers of sensors 92 or different instruction sets are loaded based on the number of sensors 92 to be used. Different occupant detection systems may resolve different characteristics or types of occupants. A greater number of sensors 92 may allow for resolving different or multiple characteristics. A fewer number of sensors 92 may be used to reduce costs. The same system may be used for different situations due to the modular nature of the sensors 92. Rather than different embodiments, the modular nature allows for manufacture of component parts and assembly of the desired system with any number of antennas 93.

The sensors 92 include the sensor electronics 100. The sensor electronics 100 include analog, digital, or other circuits for communicating with the processor 98. A communications path connects the sensor electronics 100 to the processor 98. In the embodiment shown in FIG. 9, the sensor electronics 100 include circuitry for bus communications, such as pursuant to a multiple drop serial interface (e.g., I²C bus). In alternative embodiments, a direct or wired connection between the sensors 92 and the processor 98 are provided. For example, the processor 98 includes a plurality of inputs for optional connection with one or more sensors 92.

The bus 94 is a multiple drop serial interface, such as an I²C bus, but other busses may be used. The power connection 96 is separate from or included as part of the bus 94. The bus 94 provides control signals for charging and discharging the sensors 92 and for selecting the charge or discharge level for measurement. Additional, different, or fewer control signals may be provided. The bus 94 receives trigger or timing signals from the sensors 92. Additionally or alternatively, the bus 94 receives magnitude or other measurements from the sensors 92. For example, the sensors 92 output any of the measurements for an individual antenna discussed above with reference to FIGS. 1-8. As another example, the sensors 92 output a phase, capacitance, current, electric field, or other measured value.

The power connection 96 connects with a battery. The connection may be switchable, such as providing power in response to ignition on of the vehicle or other events.

FIG. 9 shows one embodiment of sensor electronics 100 for measuring the charge or discharge. The sensor electronics 100 include electronics to output data, such as digital information, responsive to the antenna 93. Analog data may be output. Any circuit may be used, such as a processor, application specific integrated circuit, analog-to-digital converter, analog circuit, digital circuit, or combinations thereof.

In one embodiment, the sensor electronics 100 include antenna connectors or connections for the top and bottom layers (sensor and shield connectors), an amplifier 106, a resistor network R1, R2, R3, a sense resistor Rsense, a voltage input Vcc, a comparator 104, and an output (timer/counter trigger). Additional, different or fewer components may be provided.

FIG. 10 shows one embodiment of the circuit of the sensor electronics 100 implemented, in part, as a microcontroller or other processor. The comparator 104 and bus interface electronics are provided in the microcontroller. The control of the measuring point is also provided in the microcontroller. Other distribution of processing may be used.

Each sensor is connected to ground. In one embodiment, the ground is the ground of the vehicle chassis. A voltage regulator avoids surges of the input power or voltage. In one embodiment, the regulator is a linear regulator, but other regulators may be used. The voltage is provided as the Vcc signal.

The amplifier 106 has a high slew rate, low DC offset voltage, low input bias current, low noise figure, single supply operation and rail-to-rail output operating voltage range. Amplifiers with other characteristics may be used. While shown separate, the amplifier 106 may be integrated into the microcontroller in other embodiments.

A low pass filter LPF connects between the microcontroller and the analog selector. The low pass filter LPF operates as an anti-aliasing filter.

The resistors R1, R2 and R3 have a same value, such as 10 K ohms. Other higher or lower resistances may be used. The resistances are matched. Alternatively, the resistors have different resistances. Additional or different resistor networks may be used. The sensor resistor is small to minimize noise on the positive input of the comparator 104. For example, Rsense is 10 K ohms, but greater or lesser values may be used.

Referring again to FIG. 9, the sensor electronics 100 operate in conjunction with the processor 98. The processor 98 selects a connection of the input 102. Alternatively, the sensor electronics 100 select the connection. A zero, ground or low voltage connection is designated 0. The 0 connection results in R2 and R1 being parallel. This arrangement establishes a ⅔ amplitude of the total charge as the reference voltage to the negative or positive input of the comparator 104. A high voltage or maximum voltage (e.g., Vcc) connection is designated as 1. The 1 connection results in R1 and R3 being in parallel. This arrangement establishes a ⅓ amplitude or voltage of the total charge as the reference voltage to the input of the comparator 104. A high impedance connection is designated as X. The X connection results no or little current passing through R1. Since R2 and R3 have a substantially same value, a ½ amplitude or voltage is input to the comparator 104. Using the input 102 and resistor network, the sensor electronics 100 may measure three different voltage levels for charging and/or discharging. Other networks or electronics may be used for measuring the same or different number of voltage levels, such as the processor 98 providing a reference voltage for the comparator. Other characteristics may be measured, such as current.

The different levels are predetermined, such as by the resistor values. Programmable levels, such as include additional network components that may be switched into or out of the network may be used. Only a subset or all of the possible levels may be used as predetermined reference levels in a given implementation.

After selecting the measurement voltage or amplitude, the processor 98 and/or the sensor electronics 100 start a counter. The counter is started at the time of change of the signal applied to the antenna 93, but may be started at other times (e.g., when a first predetermined level is reached). The step input is provided to the amplifier 106 or the charge is discharged by removing voltage from the amplifier 106 by the processor 98 and/or the sensor electronics 100. When the antenna 93 reaches a discharge or charge substantially the same as the reference input to the comparator 104, the comparator outputs a trigger signal. In response, the processor 98 or sensor electronics 100 measure the time on the counter to reach the point. An actual time, a time difference, a number of cycles, or other temporal representation may be used. In one embodiment, a trigger signal is generated and the common processor 98 determines the time information.

The process is repeated for different measurement points (e.g., ⅓, ½ and ⅔), and/or for the charge or discharge of the antenna 93. As few as one, two or three measurements may be used for each sensor 92. In one embodiment, six measurements are used, three for charge and three for discharge. Any number of measurements may be used. The sensors 92 operate sequentially, but may operate at a same time. The different timing measurements are used by the processor 98 to determine the occupant state. The timing indicates, corresponds to, or is a replacement for the area or integral of the charge or discharge.

A known capacitance may be used as a reference to improve the accuracy of measurement. The analog selector is a switch, transistor, relay, or other device for selecting between different connections. Rather than connecting to the sensor, the resistor Rsense is selectably connected with one or more reference capacitors (e.g., C1 and C2). At the beginning of operation or other time, the reference capacitance (e.g., C1 and/or C2) is measured. For example, both known capacitances C1 and C2 are measured. The result is used to compensate measured values from the sensor. A look-up table, function, or other relationship is used to adjust measured values, adjust calculated conclusions, or select different circuit components based on the reference measurements. Using the reference measurement may compensate for circuit variation and/or temperature influence.

The sensor electronics 100 may eliminate or reduce noise due to current injection. The sensor electronics 100 may communicate in a serial, parallel or other format with the processor 98.

The processor 98 is a general processor, integrated circuit, field programmable gate array, analog circuit, digital circuit, combination thereof or other now known or later developed device for determining an occupant state from sensor measurements. Any occupant state determination may be used, such as clustering to determine occupant classification.

In one embodiment, the processor 98 is the master controller for the bus 94. The processor 98 communicates the determined occupant classification, such as to an airbag controller or seat belt warning system. For example, an in-vehicle standard network is used to communicate the classification.

FIG. 11 shows one embodiment of the processor 98. The processor 98 includes a serial bus EEPROM, a microcontroller for classification and a CAN transceiver for communication with the vehicle systems.

The processor 98 is on a same circuit board, in a same housing, or is adjacent to the sensor electronics 100. For example, tails or wires connect each of one or more sensor electronics 100 in a housing operable to house one or more electronics boards connect the antennas 93 to the electronics 100. A backplane or other connector connects the processor 98 in the housing to the electronics 100. In another embodiment, the processor 98 is spaced from the sensor electronics 100. For example, the sensor electronics 100 are flexible circuits and are positioned by the antenna 93 adjacent to the occupant space. The processor 98 is positioned elsewhere in the vehicle, such as beneath a seat. The processor 98 is in a separate housing.

In one embodiment, the processor 98 operates for a single occupant space. For each occupant space (e.g., seat area), a separate processor 98 is provided. In other embodiments, one processor 98 determines occupant status for two or more occupant spaces.

The system may operate without specific wet detection. In other embodiments, measurements with different sensor connections or combinations may be used to reduce the influence of liquid or measure the influence of liquid for compensation. In alternative embodiments, a separate wet sensor is used. Liquid adjacent the sensor may affect measurements depending on shielding, insulation, waterproofing, position, or other characteristics of the sensor system. Liquid between the sensor and the load may be more likely to alter the electric field measurements, such as capacitance. By measuring wetness, the affect may be counteracted, such as a by adjusting measured values, functions, thresholds, or other information.

In one embodiment, real and imaginary components of the measured signals are separated. By measuring changes in the real component only, any liquid adjacent the sensors may be detected or affects of liquid may be reduced. The capacitive component may be more likely responsive to any water. Using either the resistive or capacitive component, liquid of sufficient quantity or affect may be detected. Due to detected liquid, an error signal or default output may be generated rather than relying on measured occupancy. Additionally or alternatively, measured values are compensated for measured liquid, such as compensated the capacitive value based on the resistive value.

Figure 12:
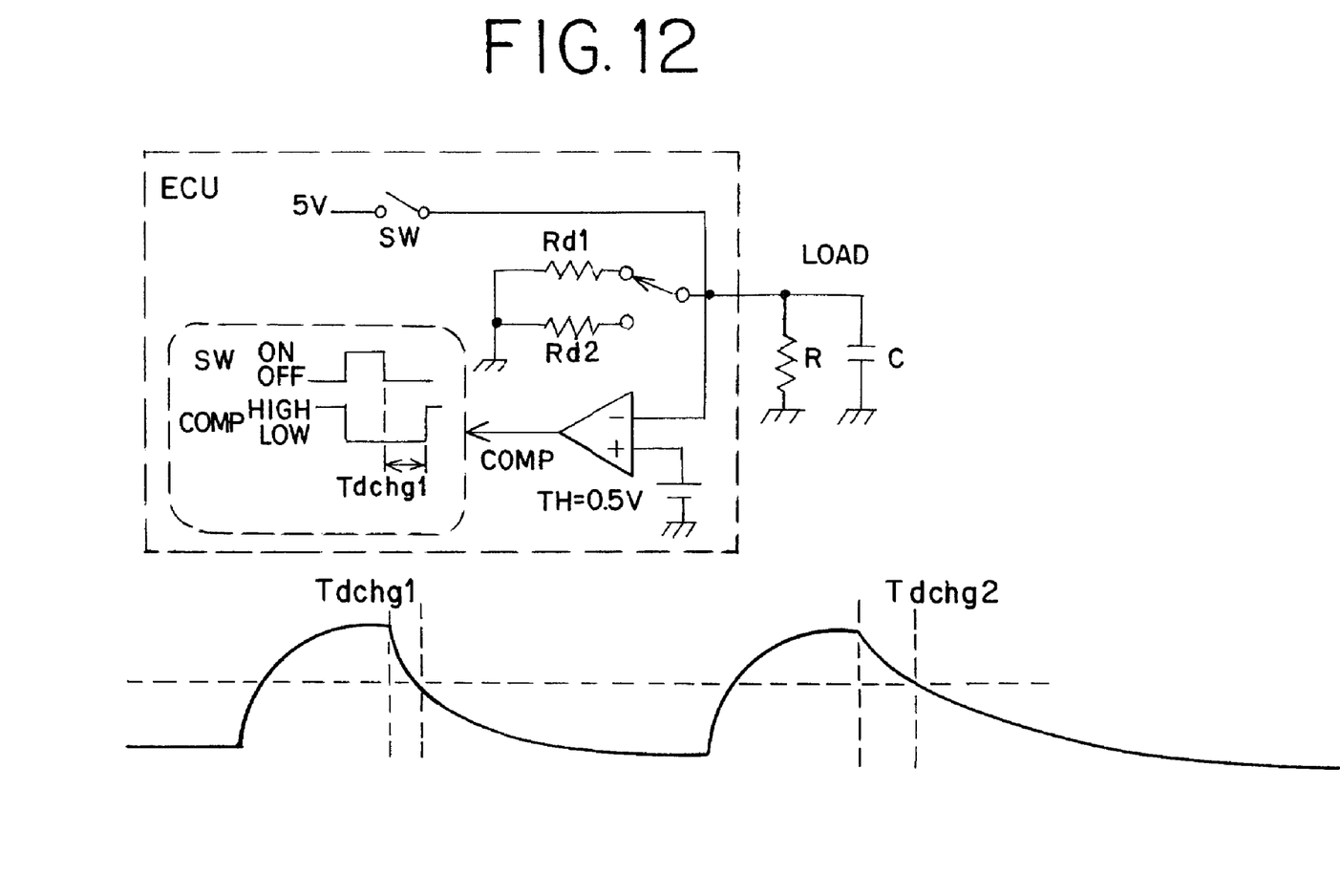
FIG. 12 is a circuit diagram and associated discharge timing of one embodiment for dealing with liquids adjacent the sensor.

To separate the real and imaginary component, two discharge paths may be provided. FIG. 12 shows one example embodiment with two discharge paths. The two discharge paths include selectable discharge resistors Rd1 and Rd2. Resistive and capacitive components are calculated separately by using the resistance value of each path and the corresponding discharge time. Measuring the discharge time (t dchg1, t dchg2) using each path allows the processor to distinguish between C and R. For example:

$$C = -\frac{t_{dchg2}}{(R // R_{d2})\ln\frac{V_t}{E}}$$

$$R // R_{d2} = (R^{-1} + R_{d2}^{-1})^{-1}$$

$$R = \frac{\frac{t_{dchg1}}{t_{dchg2}} - 1}{\frac{1}{R_{d2}} - \frac{t_{dchg1}}{t_{dchg2}R_{d1}}}$$

where E is f 5 volts, Rd1 is 46 K ohms, Rd2 is 270 K ohms, and Vt set to a desired threshold value. Other values may be used.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A sensor system for seat belt monitoring or occupant detection, the sensor system comprising:
    a first antenna positioned adjacent to an occupant space;
    a first circuit connected with the first antenna, the first circuit operable to sense with the first antenna;
    a processor operable to determine an occupant state as a function of first information output by the first circuit; and
    a communications path connected with the first circuit and the processor and operable to carry the first information from the first circuit to the processor, the processor spaced from the first circuit and the processor in a separate housing than the first circuit;
    wherein the first circuit comprises a comparator operable to compare a voltage of the first antenna with a reference voltage; and
    a resistor network operable to generate the reference voltage, wherein at least one resistor is switchably grounded, connected to a high voltage, or connected to a high impedance.

2. The sensor system of claim 1 wherein the first antenna comprises a conductor on flexible circuit material.

3. The sensor system of claim 1 wherein the processor connects with an air bag controller.

4. The sensor system of claim 1 wherein the first circuit is operable to change a voltage or current applied to the first antenna and operable to detect a response of the first antenna to the change as a function of timing.

5. The sensor system of claim 1 wherein the communications path comprises a communications bus.

6. The sensor system of claim 5 wherein the processor comprises a bus controller and the first circuit comprises a digital output operable with the bus controller.

7. The sensor system of claim 1 further comprising at least a second antenna, and at least a second circuit, the second circuit connectable with the communications path, the communications path and the processor configurable to operate with different numbers of the first and second circuits.

8. The sensor system of claim 7 wherein the first and second antennas are adjacent the occupant space for a same occupant in a vehicle.

9. The sensor system of claim 1 wherein the first information measurements associated with different switchable connections of the at least one resistor, and wherein the processor is operable to determine resistive and capacitive components as a function of the first information.

10. A method for seat belt monitoring or occupant detection, the method comprising:
provoding one or more sensor modules, each sensor module comprising at least one antenna and at least one measurement circuit, each sensor module operable to detect responsive to any occupant in a vehicle;
providing for a common processor operable to determine an occupancy state as a function of the detections from the sensor modules; and
arranging for communications from each of the sensor modules to the common processor, the common processor operable with different numbers of the sensor modules, and arranging for information from the common processor to the sensor modules.

11. The method of claim 10 wherein arranging comprises providing a bus between the sensor modules and the common processor.

12. The method of claim 10 further comprising:
each sensor module operating autonomously from each other and sharing a communications path with the common processor.

13. A sensor system for seat belt monitoring or occupant detection, the sensor system comprising:
a first antenna positioned adjacent to an occupant space; and
a first circuit connected with the first antenna, the first circuit operable to change a voltage or current applied to the first antenna and operable to detect timing of a response of the first antenna to the change, the response being a discharge or charge over time where a rate of the response lags a rate of the change in the applied voltage or current, the lag between the rate of the response and the rate of the change being a function of a capacitance in the occupant space, and the timing corresponding to a time for the discharge or charge to occur, the timing detected during a transition from a first applied voltage to a second applied voltage.

14. The sensor system of claim 13 wherein the first circuit comprises a comparator operable to compare the response of the first antenna with a reference.

15. The sensor system of claim 14 wherein the first circuit comprises a resistor network operable to generate the reference.

16. The sensor system of claim 15 wherein at least one resistor is switchably connectable to at least two sources from the group of: low voltage, grounded, high voltage, or a high impedance, the reference responsive to a currently connected source.

17. The sensor system of claim 13 wherein the first circuit comprises a counter operable to count until the response is at a reference, the timing being a function of the count.

18. The sensor system of claim 13 wherein the first circuit is operable to detect a first time to a first reference for a first response and a second time to a second reference for a second response.

19. The sensor system of claim 18 further comprising:
a processor operable to determine an occupant state as a function of the timing; and
a bus connected with the first circuit and the processor and operable to communicate the timing from the first circuit to the processor.

20. A method for seat belt monitoring or occupant detection, the method comprising:
charging or discharging an antenna adjacent to an occupant space;
timing the charging or discharging of the antenna relative to a reference level, the timing being an amount of time from a beginning of the charging or discharging determined as a function of a measurement made during a transition from a first level to a second level of voltage or current on the antenna, a rate of the transition being a function of capacitance in the occupant space; and
determining an occupant state of the occupant space as a function of the timing.

21. The method of claim 20 wherein timing comprises comparing a voltage or current of the antenna to a reference voltage or current.

22. The method of claim 20 wherein timing comprises counting a number of cycles until the charging or discharging reaches the reference level.

23. The method of claim 20 further comprising generating the reference level and generating another reference level, wherein determining comprises determining as a function of the timing with respect to the reference level and other timing with respect to the other reference level.

24. The method of claim 23 wherein generating the reference level and the other reference level comprise connecting a reference circuit to at least two sources, respectively, from the group of: low voltage, grounded, high voltage, or a high impedance.

25. The method of claim 20 further comprising timing the charging or discharging relative to another reference level different than the reference level, wherein determining comprises determining as a function of both timings.

26. The method of claim 20 further comprising:
separating capacitive and resistive components of the timing;
wherein determining the occupant state comprises determining as a function of the resistive component.

* * * * *